Aug. 25, 1925.                                                1,551,126
                        L. J. WHITE
                   STEERING SPINDLE BOLT
                   Filed Jan. 23, 1925
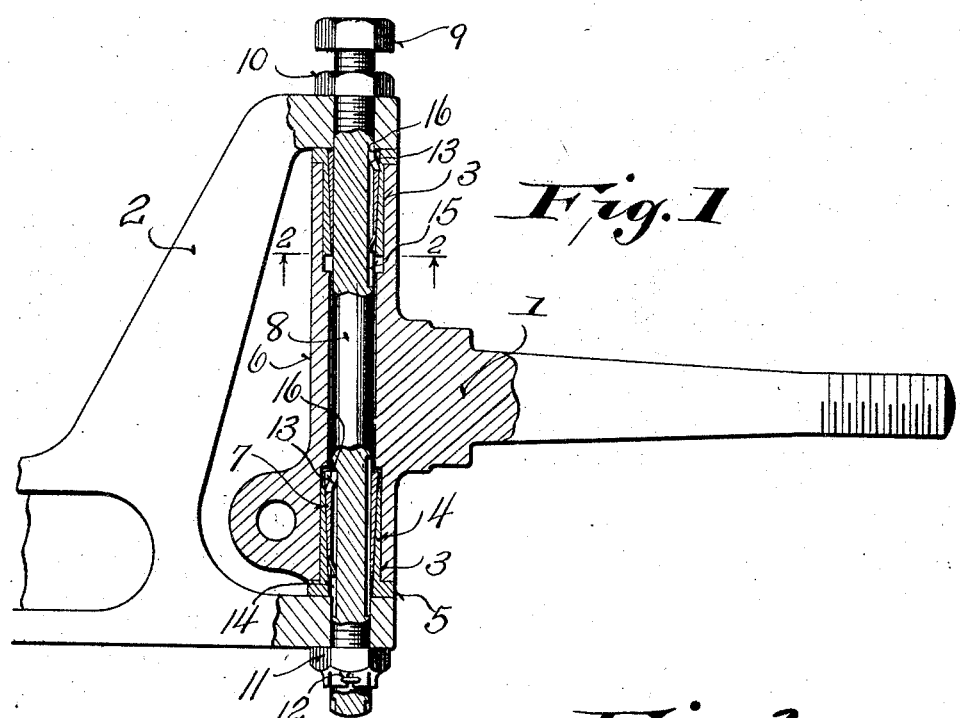
Fig. 1
Fig. 2
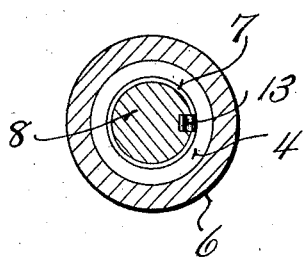
Fig. 3
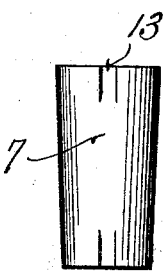
Inventor:
Leo J. White Patented Aug. 25, 1925.

1,551,126

UNITED STATES PATENT OFFICE.

LEO J. WHITE, OF KENOSHA, WISCONSIN, ASSIGNOR OF ONE-HALF TO GEORGE A. LISHKA, OF KENOSHA, WISCONSIN.

STEERING-SPINDLE BOLT.

Application filed January 23, 1925. Serial No. 4,279.

*To all whom it may concern:*

Be it known that I, LEO J. WHITE, a citizen of the United States, and resident of Kenosha, in the county of Kenosha and State of Wisconsin, have invented certain new and useful Improvements in Steering-Spindle Bolts; and I do hereby declare that the following is a full, clear, and exact description thereof.

This invention relates to steering spindle construction for automobiles.

In steering spindles as heretofore constructed, it has been the practice to provide the spindles with cylindrical bushings at each end, and when these bushings became worn they were completely removed and new bushings substituted therefor.

This invention is designed to provide for the continued use of the bushings in a spindle, and objects of such invention are, therefore, to provide a spindle construction in which provision is made for taking up the wear in the bushings without discarding or renewing such bushings, in which an accurate fit is assured at all times, and in which the adjustment may be most readily effected by an unskilled operator without requiring the services of a machinist.

Further objects are to provide a spindle construction which is of simple type and may be made comparatively cheaply, and to provide a construction which may be easily assembled in the usual types of automobiles.

An embodiment of the invention is shown in the accompanying drawings, in which:—

Figure 1 is an elevation partly in section of the spindle in place with reference to the spindle yoke.

Figure 2 is an enlarged sectional view on the line 2—2 of Figure 1.

Figure 3 is a view of the inner bushing removed.

Referring in detail to the drawings, it will be seen that the spindle 1 is of the usual construction and is mounted between the arms of the spindle yoke 2. It is provided with recesses 3 at opposite ends to receive the bushings. The bushings are composite structures and each comprise an outer bushing provided with a shell or portion 4 which is contoured on its outer side to fit the apertures 3, and which is tapered on its inner side in a conical manner. It is provided with the usual flanges 5 which overlap the end of the tubular portion 6 of the spindle.

The inner bushing 7 is conical on its outer side to fit the conical inner surface of the outer bushing 4. It has a cylindrical aperture therethrough which accommodates the spindle pin or pintle pin 8. This pin, it will be noted, is threaded and screws into the aperture in the upper arm of the spindle yoke. It is preferably provided with a wrench receiving upper portion 9 and is retained in place by means of a lock nut 10. An additional nut may be provided on its lower end, and such nut is preferably provided with slots to accommodate a split pin 12 for further security.

Referring to Figure 3, it will be seen that the inner bushing 7 is provided with tongues 13 which are formed by slits in the margins of the bushings 7. These tongues are bent inwardly, as clearly shown in Figures 1 and 2. The pin 8 is provided with slots 14 and 15. It is to be noted that the slot 14 extends upwardly from the lower end of the spindle a slight distance while the slot 15 extends from the lower end through to adjacent the upper end. Each slot is provided with an abrupt upper shoulder 16 against which the corresponding end of the appropriate tongue 13 abuts, as shown in Figure 1.

It will be seen, therefore, that in assembling the device, the bushings are positioned as shown in Figure 1, and the pin is slipped into place from the upper end and it is finally screwed into position and locked by means of the locking nuts.

The slot 15 accommodates the tongues 13 of the upper inner bushing member and the slot 14 accommodates the tongues 13 of the lower bushing member. When the pin is in place, the shoulders 16 contact with the upper end of the appropriate tongues 13. When wear occurs between the bushing members, it is merely necessary to screw the pin 8 downwardly a slight distance, thus carrying with it the inner bushing member 7. This downward motion of the inner bushing members takes up for wear due to the conical coacting surface of the inner and outer bushing members, and thus the spindle is retained in correct adjustment, and a sloppy or loose fit is at all times avoided.

It will be seen, therefore, that a spindle construction has been provided in which means are furnished for taking up wear and maintaining a perfect fit for the spindle at all times without requiring renewal or replacement of the bushings.

It will be seen further that the device is eminently practical, may be cheaply made, and is readily assembled.

Although the invention has been described in considerable detail, it is to be understood that the invention may be variously embodied and is, therefore, to be limited only as claimed.

I claim:

A steering spindle construction comprising a spindle, a yoke for said spindle, a pin passing through said yoke and spindle and threaded to said yoke, a pair of bushings within said spindle and surrounding said pin, said bushings each comprising an outer portion and an inner portion having cooperating conical faces, said inner portions having inwardly extending tongues, and said pin having slots provided with shoulders adapted to contact with said tongues, whereby axial motion of said pin is transmitted to the inner portions of said bushings.

In testimony that I claim the foregoing I have hereunto set my hand at Kenosha, in the county of Kenosha and State of Wisconsin.

LEO J. WHITE.